No. 876,108. PATENTED JAN. 7, 1908.
J. H. STRINGHAM & J. B. ELMENDORF.
NEBULIZER OF THE HEAVIER LIQUID HYDROCARBONS.
APPLICATION FILED NOV. 15, 1906.
2 SHEETS—SHEET 1.
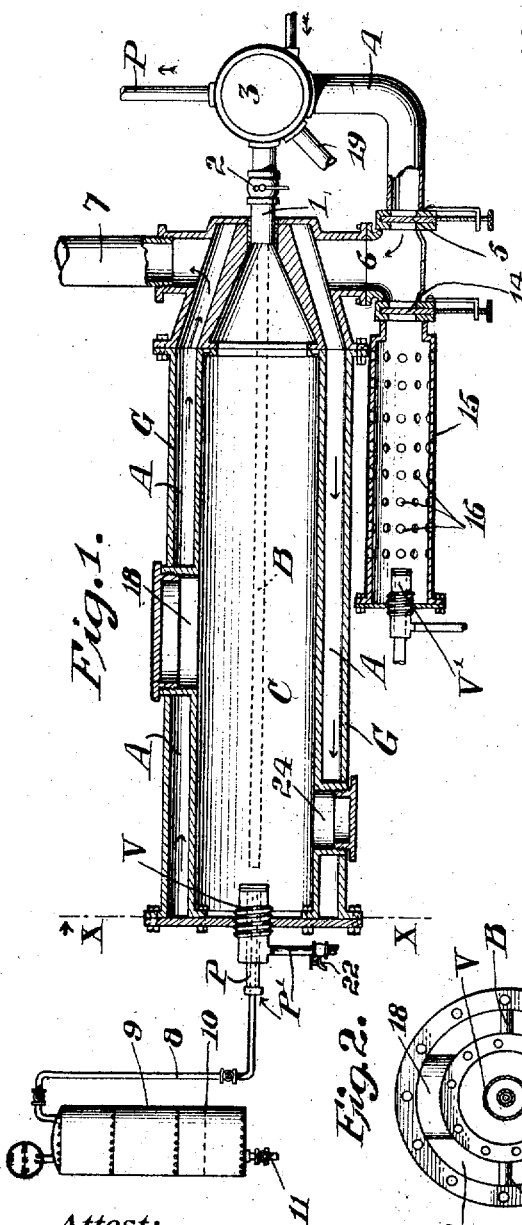
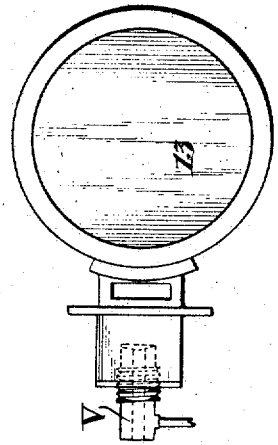
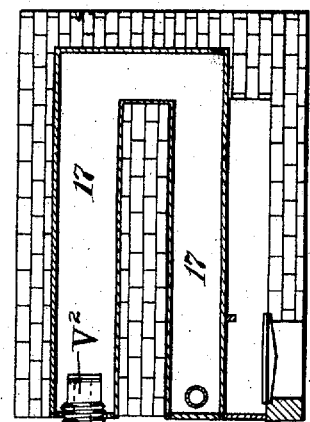
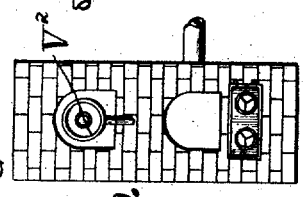
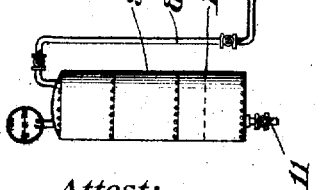
Attest:
C. C. Mitchell
Ralph C. Purnell
Inventors:
John H. Stringham
John B. Elmendorf
by Philip Farnsworth, their Atty.

No. 876,108. PATENTED JAN. 7, 1908.
J. H. STRINGHAM & J. B. ELMENDORF.
NEBULIZER OF THE HEAVIER LIQUID HYDROCARBONS.
APPLICATION FILED NOV. 15, 1906.
2 SHEETS—SHEET 2.
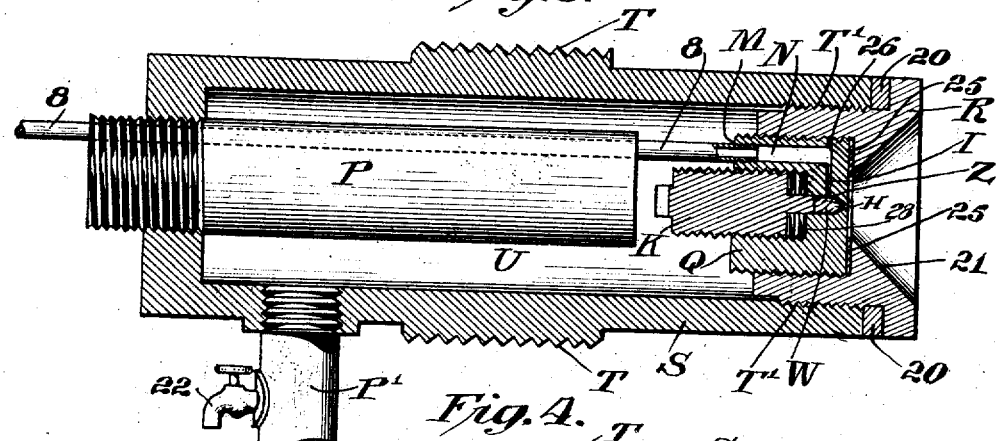
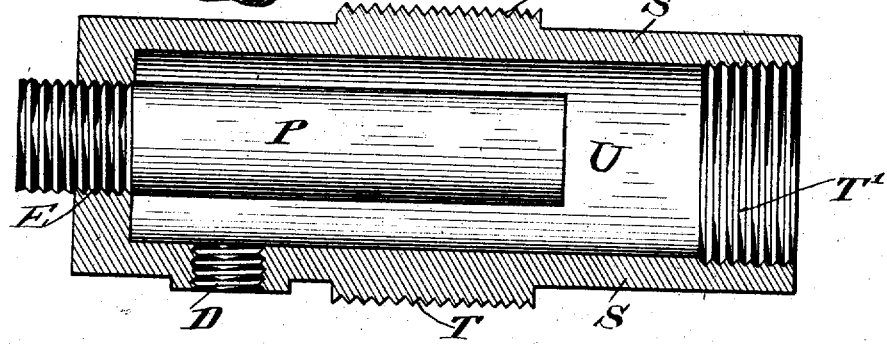
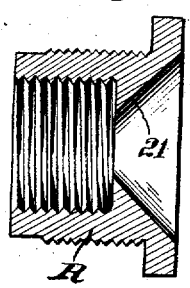
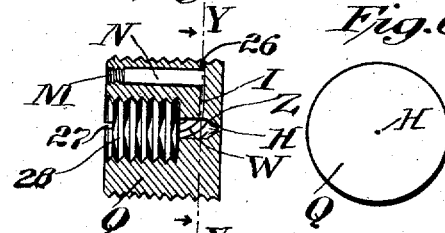
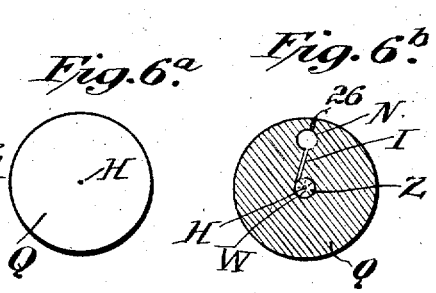
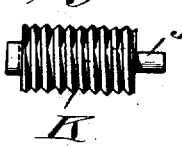
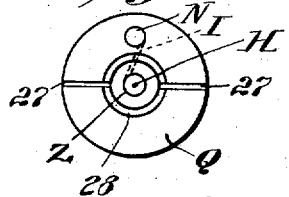
Attest:
E. C. Mitchell
Ralph C. Farwell
Inventors:
John H. Stringham
John B. Elmendorf
by Philip Farnsworth, their Atty.

UNITED STATES PATENT OFFICE.

JOHN H. STRINGHAM, OF JERSEY CITY, NEW JERSEY, AND JOHN B. ELMENDORF, OF NEW YORK, N. Y., ASSIGNORS, BY DIRECT AND MESNE ASSIGNMENTS, TO AMERICAN COMBUSTION COMPANY, A CORPORATION OF NEW JERSEY.

NEBULIZER OF THE HEAVIER LIQUID HYDROCARBONS.

No. 876,108.   Specification of Letters Patent.   Patented Jan. 7, 1908.

Application filed November 15, 1906. Serial No. 343,636.

*To all whom it may concern:*

Be it known that we, JOHN H. STRINGHAM and JOHN B. ELMENDORF, citizens of the United States of America, and residents, respectively, of Jersey City, New Jersey, and New York city, New York, have invented certain new and useful Nebulizers of the Heavier Liquid Hydrocarbons, the principles of which are set forth in the following specification and accompanying drawing, which disclose the form of the invention which we now consider to be the best of the various forms in which said principles may be embodied.

This invention relates to apparatus for nebulizing crude petroleum, and its distillates which are known in the art as gas-oils.

The object of the invention is to obtain unmixed oil-nebula without the employment of such means as the injection of steam or air with the oil; and to obtain this result without substantial or deleterious carbonization of portions of the oil by the heat employed in gasification; and the object is also to obtain oil nebula which can be gasified without the use of the excessive heat which has hitherto been employed in the absence of a spraying of the oil by air or steam jets.

The invention consists in the apparatus hereinafter described and illustrated in detail in the specification and drawing, and particularly set forth in the claims.

Of the drawings, Figure 1 is a longitudinal section of a generator embodying the invention, and shown in connection with a gas engine, as one example of an application of the invention; Fig. 2 is a section of the generator G of Fig. 1 along the line $x$—$x$; Fig. 3 is a longitudinal section of the nebulizer V of Fig. 1; Figs. 4—7 are separate views of the constituent members of the nebulizer V which are shown in assembled section in Fig. 3, Fig. 4 being a longitudinal section of the shell S, Fig. 5 a similar section of the support R for the nebulizer plug Q, Fig. 6 a similar view of the nebulizer plug Q, Fig. 7 being a side elevation of a plug K for the nebulizer plug Q; Fig. 8 is a left end view of Fig. 6; Fig. 6ᵃ is a right end view of Fig. 6; Fig. 6ᵇ is a section through Fig. 6 along the line Y—Y; Figs. 9 and 10 are a front elevation and a longitudinal section respectively of an oil gas retort embodying the invention; and Fig. 11 is a diagrammatic illustration of the combination of the nebulizer V of Fig. 1 directly with the cylinder of a gas engine.

Although many attempts have been made to attain the object of this invention, nevertheless all prior apparatus and methods have apparently resulted either in an incomplete gasification of the oil and a substantial and deleterious carbonization of a part of the oil, the products of which have clogged the apparatus and stopped the further execution of the method until the deposited carbonized residue was removed from the apparatus; or else it has been necessary to employ steam or hot compressed air to act by impact upon the oil in order to endeavor to prevent a deposit of carbonized residue, and to break up the oil to an extent sufficient to obtain any effective gasification by means of the heat; and even in the latter case serious carbonization has occurred; or else so great heat has been used to effect gasification that it shortly destroyed the generating chamber walls. Hitherto it has not been believed to be possible to mechanically nebulize the heavier oils, even with the aid of steam or hot compressed air, so that the particles of oil would be sufficiently fine to permit superheating to such an extent as to cause each particle, when it finally cracked, to be completely gasified. Hitherto, in the most effective methods which have not employed excessively great heat, it has been attempted to heat the heavy oil before spraying it with air or steam into the generator, in order that the comparatively large particles of the sprayed oil might the more readily be gasified by the heat in the generating chamber; this preheating being necessary owing to the comparatively large size of the sprayed particles of oil which could not if cold be completely gasified in a practical manner by the heat of the generator. Or, in making oil-gas in a retort, in the absence of a spray of oil by means of a steam or air jet, it has been necessary to employ temperature so high as to cause the destruction of the retort after a short usage. The necessity of a pre-heating of the oil in some of these prior processes has been a vital defect, because it resulted in a substantial carbonization which formed a residue, which in a short time rendered impossible the continuance of the execution of the process; and if the carbonizing effects of the heat of the steam or hot compressed air or of the generator upon the oil were reduced by lowering the temperature of the oil supplied to the generator, then the advantage in pre-heating was lost to that extent. The necessity of the use of steam or air to break up the oil, or of the use of extremely high temperature to gasify oil not broken up, has been a vital defect in these processes, not only on account of the accompanying expense and inconvenience, but because it made it impossible to obtain an unmixed oil gas, the resulting product being either a dangerously explosive mixture, or a deleterious condensation of steam in the apparatus to which the product was supplied; and when an unmixed gas-oil has been obtained, without the use of a steam or air jet, as in a retort employing a high temperature, the carbonized residue has been so great as to materially affect the economy of the process, independently of the cost of reconstructing the retorts when damaged by the great heat employed.

In accordance with this invention, the cold heavy oil, without pre-heating, is mechanically converted into nebula, independently of the use of steam or air or similar means which hitherto simply broke up the oil into a mere spray, as distinguished from nebula or extremely fine mist. The oil alone, in the form of nebula, is then in condition to be utilized in slow combustion as in a burner; and in case it is desired to use it in the form of gas, it is when thus nebulized, in condition to be completely gasified by being conducted into, or formed in, a heated gas-generating chamber, wherein the extremely fine particles of oil constituting the nebula will be superheated to a much greater degree before cracking than is possible in the case of the comparatively large particles of a spray caused by the impact of steam or air on the liquid oil. By this excessive superheating before it finally cracks, each particle of the vapor, when the critical temperature condition is reached, is practically completely converted into unmixed oil-gas, free from any admixture of steam or air, and suitable for any of the uses to which an illuminating or explosive gas may be put. The oil before being nebulized is kept below the temperature of carbonization, thus preventing the formation of any residue in the oil supply or its outlet; this maintenance of a low temperature of the oil being permissible owing to the fact that pre-heating is not necessary in this process, but on the contrary is deleterious. Owing to the complete mechanical nebulization of the oil, and the resulting substantially complete gasification of each minute particle of nebula, substantially no carbonization occurs in the generating chamber, wherein substantially all the heat utilized is expended in superheating the respective minute particles up to their cracking temperature. Notwithstanding the fact that in accordance with this invention, the oil is superheated to a greater degree before gasification than hitherto, the amount of heat energy required to produce a given volume of oil gas is very much less, because substantially none of the heat energy is wasted in carbonization, the product of which itself is a waste.

A concrete operative example of an application of the invention to generate gas for a gas engine supply, in which it has been successfully used in practice, is shown in Fig. 1, wherein G is a gas generator having an inner chamber C connected to supply the gas through the pipe 1 provided with valve 2 to the cylinder valves of the engine 3 of any suitable well-known type adapted to be operated by gas-explosions and provided with an air-inlet 19. The exhaust is led from the engine to an annular chamber A of the generator G, to supply heat thereto, in accordance with the well known method; the exhaust gases passing from the engine through the pipe 4, gate-valve 5, chamber 6, and thence to the annular chamber A.

As shown in Figs. 1 and 2, the chamber A is provided with partitions B, which extend not quite (Fig. 1) to the left hand end of the generator, so that the exhaust gases pass from the chamber 6 to the left (see arrows Fig. 1), in the lower part of chamber A, thence around the end of the partitions B, thence to the right in the upper part of the chamber A, and then to the atmosphere through the pipe 7, after having given up most of their heat to the walls separating chamber A from chamber C, so that the space within these walls in the chamber C is maintained at a high temperature. Into the left end of the generator G is screwed the mechanical nebulizer V, to which the heavy oil is supplied through the pipe 8 from tank 9 containing the oil under comparatively high pressure, in the case shown of about twenty five pounds, the pressure being preferably that of a column of water 10 connecting with an open cock in the water supply pipe 11, although the pressure might be obtained by the use of air, or by an oil pump. As the nebulized oil alone, free from any other material, issues from the right-hand end of the nebulizer V, it becomes substantially completely gasified by the heat in the chamber C, and passes to the place of utilization, which is the gas engine 3 in the example shown. The portions of oil which are carbonized in this process are so small that they all pass readily with the gas to the place of utilization, without deposition in the generating chamber or the various passages.

The nebulizer V, which contains the controlling mechanism of the invention, is shown in detail in Figs. 3—8, and in Figs. 6ª and 6ᵇ, Fig. 3 being an assembly. It consists of a shell S (Fig. 4) exteriorly threaded at T for screwing into the generator G, as shown in Fig. 1; and interiorly screw-threaded at T' to receive a part to be described. The shell S has a threaded opening D for an outlet water pipe connection, and another threaded opening E for a connection for the inlet water pipe P.

The threaded opening T' receives the support R (Fig. 3) for the nebulizer plug Q, which parts are shown respectively in detail in Figs. 5 and 6. As shown in Fig. 3, the support R has a gasket 20 between it and the end of the shell, and a gasket 25 between itself and the plug Q, in order to make the shell water tight; and it has a flange 21 which serves as a limiting stop for the nebulizer plug Q and also to prevent the water under pressure in the interior U of the shell, from being forced out. The flange 21 is inclined as shown, so as not to interfere with the formation of the nebula.

In Fig. 8 are shown the slots 27 by which the plug Q shown separately in Fig. 6 is screwed into the support R, which is shown separately in Fig. 5. The nebulizer plug Q contains a minute cylindrical passage Z which is the tiny centrifugal passage which receives the heavy oil under high pressure, and converts it into nebula, being made with an ordinary drill, thus leaving a small cone at its right hand end. This little passage, shown in Fig. 6ᵇ, is only one eighth of an inch long and one eighth of an inch in diameter, and, although the prior art has lacked extremely small oil passages in centrifugal oil spraying devices, its concentric outlet H at the right hand end, shown in Figs. 6ᵃ and 6ᵇ, is formed by a number eighty Morse drill, about the smallest operative drill in existence. The passage Z is made to extend as near as possible through the nebulizer plug, without actually breaking through; and then the hole H is drilled from the outside. Thus the extremely fine oil outlet includes an outlet passage of some little length between the centrifugal passage Z and the exterior of the nebulizer. The oil inlet passage I in the top, being in the lateral wall of the cylindrical opening, is formed by a number seventy Morse drill, and is directed substantially tangent to the inner surface of the cylindrical passage Z, and located about midway of the length of this passage.

The passage I is drilled through from the outside of the plug Q, and then the opening in the outside surface of the plug is closed up permanently by a small plug 26. The inlet I is preferably at right angles with the horizontal axis of the passage Z, but it is operative if its position departs to an extent from this. The interior surface of the cylindrical passage Z is serrated as shown at W, the serrations being formed by a serrating tool or jeweler's reamer of a diameter slightly larger than that of the passage, which reamer is punched into the passage to form the curved serrations or grooves, as shown, somewhat resembling the rifling of a fire-arm. The oil inlet I is continued with a horizontal portion N, larger than the passage I and having a threaded opening M about three-sixteenths of an inch in diameter, to receive the oil supply pipe 8, which extends into the shell S through the water inlet pipe P. When the heavy oil is forced under the high pressure stated, through the pipe 8, passages N and I, it flows into the centrifugal passage Z in an extremely fine stream at an extremely high rate of speed; and this fine stream of heavy oil flows at high speed around the inner surface of the centrifugal passage Z, which has a diameter which is large as compared with that of the inlet I, although actually small, so that the peculiar action due to the movement of the oil, causes an extraordinary whirling of the oil as it flows to the right toward the extremely fine outlet H, where it is contracted so as to assume the form of an extremely fine stream, the parts of which are now in a whirling state, however; and from the outlet H, the oil issues in the form of a hollow whirling globule or bubble which instantly breaks up into nebula, owing to the pressure behind the oil, the extreme fineness of the inlet and outlet of the centrifugal passage of comparatively substantially larger but absolutely small diameter, and the centrifugal action inside that passage. The mechanical structures involving the disclosed arrangement and absolute and relative sizes of these passages may be various.

The arrangement of the oil inlet pipe 8 inside the water inlet pipe P, permits the pipe 8 to enter inside the space U without contact with the shell S, which might cause the incoming oil to be unduly heated. The outlet pipe P′ is provided with a stop cock 22, so that the cock may be adjusted to permit a smaller outflow of water than can enter the shell through the pipe P, so that the shell U will be always full of water which will cover the exposed surfaces of the parts R, Q and K, which parts would otherwise become heated by the heat used in heating the oil-nebula. If desired, the pipe P′ may be the water inlet, and the pipe P the water outlet.

The left hand end of the centrifugal passage Z is itself open (Fig. 6) but is in operation closed by a part J (Figs. 7 and 3) fitting the opening and projecting from a plug K (shown separately in Fig. 7), which is adjustably screwed into the central opening 28 in the nebulizer-plug Q. This projection J may enter to a greater or less extent into the cylindrical passage Z as desired for varying conditions, such as different grades of heavy oil and different pressures thereof. The right-hand end of the part J is flat to constitute a flat closure for the centrifugal passage Z.

The apparatus will operate satisfactorily if the regulating projection J be adjusted into the cylindrical passage Z as far as the inlet I; but it operates best when the inlet I is about midway between the outlet H and the other end of the passage Z, formed by the end of projection J. The quantity of substantially completely gasified nebula produced, and the quantity of oil supplied, and the length of the whirling globule of oil issuing from the outlet H, increase as the length of the centrifugal passage Z is increased up to the extent which results in the inlet I being substantially midway of the length of the passage Z, other conditions being fixed. The best results, with a given quality of oil, may be obtained by a trial adjustment of the extent of projection of the regulator K, J. This adjustment may be made permanently at the factory for apparatus recommended for use with oil of a given quality.

The inlet I and outlet H are so minute that they cannot be shown in exact size on the drawings. In the operative example described, the inlet I is formed by a number seventy Morse drill, and the outlet H by a number eighty Morse drill. The outlet H should be slightly smaller than the inlet I, in order to obtain the pressure inside the passage Z which produces the best results; although the difference in diameter is very slight, as is indicated by the dimensions stated. A diameter of the passage Z of one-eighth of an inch apparently produces the best results with the stated diameters of the inlet I and outlet H, although a diameter of passage Z of one-sixteenth of an inch gives good results. A pressure behind the oil of about twenty five pounds appears to produce the best results, although a higher pressure up to at least sixty pounds gives good results as to the gasifiable nebula produced. If the pressure is reduced very much below twenty five pounds, for the above dimensions of structure, the process degenerates into a mere more or less effective spraying of the oil, which consumes a much larger quantity of oil which is simply squirted at low pressure through the passage Z, without substantial interior action and without producing a nebula, and without any more than a partial gasification of the sprayed oil, when heated, as in the prior art. With the dimensions given above, one gallon of crude oil or one gallon of gas oil will be nebulized each hour, using a pressure behind the oil of about twenty five pounds. With the dimensions of inlet and outlet given above, but with a diameter of the passage Z of one quarter of an inch instead of one eighth, one gallon of crude oil or kerosene per hour can be nebulized under an oil pressure of about twenty five pounds; but with a diameter of the passage Z materially greater than one eighth of an inch, and with the stated diameters of the outlet and inlet, gas oil apparently cannot be vaporized, under any oil pressure whatsoever, the reason for this being as yet obscure. In general, the sizes of the inlet and outlet may be slightly increased to nebulize larger quantities of oil, the operating oil pressure being increased as the inlets and outlets used are of larger diameter. At best, these passages are extremely fine, but practice has demonstrated that they will not become clogged with a carbonized residue.

Under the operative conditions above set forth, the nebula resulting from the breaking up of the whirling globule at the outlet H, is composed of such extremely fine particles that it can be blown away with the breath from the place of its formation, and in appearance it almost precisely resembles steam. If the hand be held in front of the place of formation, there is no sensation of impact of the nebula.

When the nebulizer V is screwed in the wall of the generator G, as shown in Fig. 1, the water inlet pipe P is connected to the water jacket of the engine 3, in this particular application of the invention. The part of the nebulizer which projects into the generator G is subjected to a high temperature, which by metallic conduction might, on occasions, keep all the parts of the nebulizer hot enough to carbonize the oil, particularly in the extremely small passages of the nebulizer. But in the construction shown, the entire interior space U of the shell S is kept filled with circulating water under pressure, which wastes through the pipe P'. The oil inlet pipe 8 extends through the water inlet pipe P. Since nothing but the oil passes through the fine passages I, H, and the cylindrical passage Z, it is important to keep it below carbonizing temperature by this means, which may be accomplished even by the warm water from the engine water jacket, as the water need not be cold. If desired to produce a greater quantity of nebula in a given installation for given conditions and with given adjustments of the cylindrical passage Z, a plurality of such passages may be used, either combined in one nebulizer plug Q, or by the use of a plurality of nebulizers V, Fig. 3.

If desired, the nebulizer V may be directly connected with the cylinder of a gas engine 13, as shown in Fig. 11, to which cylinder air may be admitted in the usual way to form an explosive mixture with the oil nebula; the generating chamber in this case being the engine cylinder itself. Or, to start cold the engine 3 of Fig. 1, a burner may be arranged, as shown below the generator, to supply hot products of oil-nebula combustion through the gate valve 14 to the chamber 6 and heating chamber A, when the exhaust valve 5 is closed. The generating chamber C may thus be preliminarily heated, so that gas may be generated therein from the oil-nebula issuing from the nebulizer V. The oil-nebula burner comprises a chamber 15 connected with the valve 14, and formed with air inlet openings 16. A nebulizer V', constructed and operated precisely like nebulizer V of Fig. 1, is screwed into the left end wall of the chamber 15, and no air is permitted inside the nebulizer V' or to have access to the oil in any manner until the oil-nebula issues from the whirling oil globule at the end of the cylindrical passage Z. The nebula then mixes with the air in the chamber 15, forming a combustible mixture which may be readily ignited, and the resulting hot products of combustion flow through the valve 14 to the heating chamber A, thus drawing in additional air through the openings 16 to mix with the continued formation of oil-nebula in the chamber 15; or air may be forced into the chamber 15 through the opening 16 by any suitable means such as a blower. A burner constructed and operated in accordance with these principles, may be used in any other application where heat is required.

The invention disclosed herein is particularly useful in the manufacture of gas in retorts, for illuminating purposes, as shown in Figs. 9 and 10. In these figures is shown an ordinary retort of this kind, as used for the production of gas to be compressed, and stored in cylinders, and used for the illumination of railway cars or vehicles. The retorts have a U-shaped generating chamber 17, provided, for example, with a malleable iron lining an inch or two thick, and incased in brick-work as shown, the heat being applied from a fire box located beneath the retort. It has been the practice to cause the heavy oil to drop upon the interior surfaces of these retorts, reliance being placed solely on the high temperature produced in the fire-box, to effect gasification, this being the most effective process for this purpose prior to this invention in the art of making illuminating oil-gas in retorts, and the one most commonly used. But the high temperature required to produce gas from the drops or streams of oil, not only carbonized the oil to a great extent, requiring frequent stoppage of the process and a cleaning out of the retort; but it resulted at least every few weeks in such a burn-out of the iron casing as to require a renewal of the brick-work and a complete reconstruction of the retort, including replacement of the iron walls of the generating chamber. In order to operate this invention with such a retort, the nebulizer V is simply placed in the position shown in Fig. 10, at one end of the chamber 17, this nebulizer being constructed and operated precisely as the nebulizer V of Fig. 1. Then when the nebulizer is operated, the same gas heretofore produced in such retorts, is made by so much less expenditure of heat as to indefinitely prolong the life of the retort, while at the same time preventing a wasteful carbonization of the oil, and without requiring any air or steam jet for spraying. In this case, as in Fig. 1, the extremely fine particles of the oil nebula are apparently superheated to the highest critical point, before they crack to produce complete gasification.

In the gas generator for use with this invention, as shown in Fig. 1, there may be an opening 18 for a gas exit to permit the flow of the gas for testing purposes; and there may also be an opening 24 to permit the withdrawal of condensed oil-nebula in cases where the generator has been used or tested without the proper adjustment of the nebulizer or of the pressure behind the oil. In any given use or application of the invention, involving varying conditions of heat furnished or gas consumed, the installing engineer must exercise care in procuring a nebulizer in which the inlet and outlet passages are properly proportioned, and to properly adjust the pressure behind the oil. Naturally, these proportions might be such as to cause the production of more nebula than could be gasified by the heat provided, and in such case the ungasified nebula would condense into its fluid form, making possible the carbonization of the liquid on the lower wall of the generating chamber. In cases where sufficient heat is employed, as in the retort of Fig. 10, a fixed gas is produced, but it is not necessary to produce a fixed gas for use in gas engines, as in Fig. 1.

Naturally, many minor changes may be made within the scope of the invention, not only in the structure, but in the mode of use of the structure, and also in the manner of executing the process. For example, the centrifugal passage Z might assume a conical form, as a continuation of its outlet end, instead of one strictly cylindrical, and the latter word is here used to include all such formations of this passage which possess a substantially circular cross-section, or which operate in accordance with the principles of the invention.

We do not herein claim the invention in its gas-generating aspects, that being the subject-matter of our application Serial Number 368,433; and we do not herein claim the invention in its gas-burner aspect, that being the subject-matter of our application Serial Number 366,698.

We claim:

1. A nebulizer of liquid hydrocarbons which consists of a structure having in combination a small centrifugal oil passage closed at one end and having an extremely fine nebulizing outlet at its other end, and having an extremely fine outlet passage extending from said outlet, and having also means admitting oil in extremely limited volume to whirl in the small centrifugal passage toward said extremely fine outlet, whereby the oil is discharged from the nebulizer in an extremely fine mist.

2. A nebulizer of liquid hydrocarbons which consists of a structure having in combination a small centrifugal oil passage closed at one end and having an extremely fine nebulizing outlet at its other end, and having a single extremely fine oil inlet admitting oil to whirl in the small centrifugal passage toward said extremely fine outlet, whereby the oil is discharged from the nebulizer in an extremely fine mist.

3. A nebulizer of liquid hydrocarbons which consists of a structure having in combination a small centrifugal oil passage having a substantially flat closure at one end and a substantially conical shape at the other end, and an extremely fine nebulizing outlet at the point of the conical end, and means admitting oil in extremely limited volume to whirl in the small centrifugal passage toward the extremely fine outlet.

4. A nebulizer of liquid hydrocarbons which consists of a structure having in combination a small centrifugal oil passage closed at one end and having an extremely fine nebulizing outlet at its other end, and means admitting an extremely fine stream of oil into the small centrifugal passage substantially tangent to the wall thereof and at an angle to the axis thereof, to cause the oil in extremely limited volume to whirl in the small centrifugal passage toward said extremely fine outlet, whereby the oil is discharged from the nebulizer in an extremely fine mist.

5. A nebulizer of liquid hydrocarbons which consists of a structure having in combination a small centrifugal oil passage having an extremely fine oil outlet on one end, an adjustable plug closing the other end, and means admitting oil in extremely limited volume to whirl in the small centrifugal passage toward the extremely fine outlet.

6. A nebulizer of liquid hydrocarbons which consists of a structure comprising means for constricting a stream of oil into an extremely fine stream; in combination with means for causing the extremely fine stream to assume the state of a whirl which is small in diameter but substantially larger than said extremely fine stream; and means for contracting the whirl, prior to its ejection from the nebulizer, into another extremely fine stream; whereby the oil is discharged from the nebulizer in an extremely fine mist.

7. A nebulizer of liquid hydrocarbons which consists of a structure having in combination a small centrifugal oil passage closed at one end and having an extremely fine nebulizing outlet at its other end, and means admitting oil in extremely limited volume to whirl in the small centrifugal passage toward said extremely fine outlet, whereby the oil is discharged from the nebulizer in an extremely fine mist.

8. A nebulizer of liquid hydrocarbons which consists of a structure having in combination a small centrifugal oil passage closed at one end and having an extremely fine nebulizing outlet at its other end; means admitting oil in extremely limited volume to whirl in the small centrifugal passage toward said extremely fine outlet, whereby the oil is discharged from the nebulizer in an extremely fine mist; and means for forcing the oil under pressure through said admission means.

9. A nebulizer of liquid hydrocarbons which consists of a structure having in combination a small centrifugal oil passage closed at one end and having an extremely fine nebulizing outlet at its other end; means admitting oil in extremely limited volume to whirl in the small centrifugal passage toward said extremely fine outlet; whereby the oil is discharged from the nebulizer in an extremely fine mist; and means for maintaining a fluid circulation to cool said structure.

10. A nebulizer of liquid hydrocarbons which consists of a structure having in combination a small centrifugal oil passage of general cylindrical form, closed at one end and having an extremely fine nebulizing outlet at the other end, and means admitting oil in extremely limited volume to whirl in the small centrifugal passage toward said extremely fine outlet, whereby the oil is discharged from the nebulizer in an extremely fine mist.

11. A nebulizer of liquid hydrocarbons which consists of a structure having in combination a small centrifugal oil passage of general cylindrical form and having a substantially flat closure at one end and a substantially conical shape at the other end, and an extremely fine nebulizing outlet at the point of the conical end, and means admitting oil in extremely limited volume to whirl in the small centrifugal passage toward the extremely fine outlet.

12. A nebulizer of liquid hydrocarbons which consists of a structure having a small centrifugal oil passage closed at one end and having an extremely fine nebulizing outlet at its other end; means admitting oil in extremely limited volume to whirl in the small centrifugal passage toward said extremely fine outlet; and inlet passage means to constrict the volume of admitted oil prior to its entrance into the small centrifugal passage; all whereby the oil is discharged from the nebulizer in an extremely fine mist.

JOHN H. STRINGHAM.
JOHN B. ELMENDORF.

Witnesses:
PHILIP FARNSWORTH,
RALPH C. POWELL.